United States Patent
Xiong

(10) Patent No.: US 9,419,514 B1
(45) Date of Patent: Aug. 16, 2016

(54) HIGH POWER FACTOR DC POWER SUPPLY WITH VARIABLE GAIN CONVERTER AND FAST-AVERAGING CONTROL LOOP

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 187 days.

(21) Appl. No.: 14/255,531

(22) Filed: Apr. 17, 2014

Related U.S. Application Data

(60) Provisional application No. 61/815,745, filed on Apr. 25, 2013.

(51) Int. Cl.
| | |
|---|---|
| H05B 37/00 | (2006.01) |
| H05B 39/00 | (2006.01) |
| H05B 41/14 | (2006.01) |
| H02M 3/335 | (2006.01) |
| H02M 1/42 | (2007.01) |
| H05B 37/02 | (2006.01) |

(52) U.S. Cl.
CPC ........ *H02M 1/4208* (2013.01); *H02M 3/33507* (2013.01); *H05B 37/02* (2013.01)

(58) Field of Classification Search
CPC . H02M 1/4208; H02M 3/33507; H05B 37/02
See application file for complete search history.

(56) References Cited

U.S. PATENT DOCUMENTS

| | | | |
|---|---|---|---|
| 2002/0030451 A1* | 3/2002 | Moisin | 315/219 |
| 2010/0014326 A1* | 1/2010 | Gu et al. | 363/45 |
| 2013/0093325 A1* | 4/2013 | Scarpelli | 315/85 |
| 2014/0091720 A1* | 4/2014 | Brinlee | 315/186 |

* cited by examiner

*Primary Examiner* — Jue Zhang
(74) *Attorney, Agent, or Firm* — Patterson Intellectual Property Law, P.C.; Mark J. Patterson; Gary L. Montle

(57) ABSTRACT

A high power factor DC power supply with low output ripple uses a variable gain DC to DC converter and fast averaging control loop to eliminate the need for a large electrolytic capacitor at the output of the PFC circuit. A resonant tank circuit of the DC to DC converter is sized to provide a predetermined output voltage to the load when the PFC circuit output is at its minimum. A closed loop control circuit varies an operational frequency of the DC to DC converter (i.e., an inverter of the DC to DC converter driving the resonant tank circuit) to compensate for voltage ripple on the DC power rail provided to the DC to DC converter from the PFC circuit. An optional clamping circuit limits output from the resonant tank to the load to further reduce ripple in the power provided to the load.

18 Claims, 3 Drawing Sheets

HIGH POWER FACTOR DC POWER SUPPLY WITH VARIABLE GAIN CONVERTER AND FAST-AVERAGING CONTROL LOOP

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to and hereby incorporates by reference in its entirety U.S. Provisional Patent Application Ser. No. 61/815,745 filed on Apr. 25, 2013.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a direct current (DC) power supply. More particularly, this invention pertains to DC power supplies that include DC to DC converters.

Large electrolytic capacitors are commonly used in power supplies to provide energy buffering between sections of the power supply. The electrolytic capacitor typically has shorter life time than the other electronics components in the power supply such that it is the limiting factor in service life. Service life of a DC power supply may thus be increased by eliminating use of an electrolytic capacitor.

Referring to FIG. 1, a prior art high power factor DC power supply 100 typically has two main sections: a power factor correction (PFC) circuit 102 and a DC to DC converter 104. The PFC circuit 102 is used to convert alternating current (AC) power from a power source VAC_in into DC power and correct the input power factor to meet applicable industrial standards (typically greater than 0.9). The output of the PFC circuit 102 is a DC voltage rail with a voltage greater than the maximum peak voltage of the AC power source VAC_in. An electrolytic capacitor C4 is typically used at the output of the PFC circuit 102 to buffer the DC power rail for the DC to DC converter stage 104. The ripple voltage ΔV at the output of the PFC circuit 102 is dependent on the input power and output voltage of the PFC circuit 102. ΔV can be defined as shown in Equation 1.

$$\Delta V = \frac{P_{in}}{V_{pfc\_out}} \cdot \frac{1}{4 \cdot \pi \cdot f \cdot C4} \quad \text{EQUATION 1}$$

In Equation 1, $P_{in}$ is the input power to the PFC circuit 102, $V_{pfc\_out}$ is the output voltage of the PFC circuit 102 (i.e., the voltage across the electrolytic capacitor C4), f is twice the input frequency (e.g., if the frequency of the AC source VAC_in is 60 Hz, a 120 Hz ripple would appear across the output of PFC circuit 102), and C4 is the capacitance of the electrolytic capacitor C4. Typically, the ripple voltage ΔV is selected to be in the range of 1 to 5% of the PFC circuit output voltage. For example, for a 60 watt input and 460 v output PFC, a 16 μF electrolytic capacitor has to be used to maintain a 1% voltage ripple across the electrolytic capacitor C4 (i.e., to keep the ripple voltage on the DC rail to 1% or less).

The DC-DC converter 104 regulates the output power (e.g., voltage and/or current) to the load 106. A closed loop control circuit 108 is typically used for the DC to DC converter 104 in this type of power supply 100 to maintain output stability and accuracy. Input to the closed loop control circuit 108 includes at least one of a current I_sense through the load 106 or a voltage V_sense through the load 106. The output of the closed loop control circuit 108 could be controlled by frequency or duty ratio change.

The crossover frequency of the closed loop control circuit 108 is typically chosen to be less than twice the frequency of the input source VAC_in (e.g., less than 120 Hz), such that the closed loop control circuit 108 will not respond to the voltage ripple (at twice the frequency of the input source VAC_in) at the output to the load 106 allowed by the limited capacity of the electrolytic capacitor C4 to buffer the DC power rail. The voltage ripple across the electrolytic capacitor C4 will thus appear at the output of DC-DC converter 104. Typically, the output ripple percentage is approximately equal to the ripple voltage divided by the voltage across the electrolytic capacitor C4.

For a quality DC power supply 100, the maximum output ripple is generally 5%. The ripple across the electrolytic capacitor C4 is thus limited to 1%. Thus, with a conventional closed loop control circuit 108 and DC to DC converter 104, a relatively high capacitance electrolytic capacitor C4 must be used to main the desired level of output ripple.

BRIEF SUMMARY OF THE INVENTION

Aspects of the present invention provide a high power factor DC power supply with low output ripple that uses a variable gain DC to DC converter and fast averaging control loop to eliminate the need for a large electrolytic capacitor at the output of the PFC circuit. Eliminating the large, short life electrolytic capacitor at the output of the PFC circuit (i.e., the input to the DC to DC converter) increases the service life of the overall power supply.

A resonant tank circuit of the DC to DC converter is sized to provide a predetermined output voltage to the load when the PFC circuit output is at its minimum. A closed loop control circuit varies an operational frequency of the DC to DC converter (i.e., an inverter of the DC to DC converter driving the resonant tank circuit) to compensate for voltage ripple on the DC power rail provided to the DC to DC converter from the PFC circuit. An optional clamping circuit limits output from the resonant tank to the load to further reduce ripple in the power provided to the load.

In one aspect of the invention, a driver circuit receives power from an alternating current power source and provides direct current power to a load. The driver circuit includes a power factor correction circuit, a DC to DC converter, and a closed loop control circuit. The power factor correction circuit receives AC power from the AC power source and provides a DC power rail. The DC power rail has a ripple voltage having a frequency. The DC to DC converter receives power from the DC power rail and provides a DC output voltage or current to the load from a DC output of the DC to DC converter is a function of a control signal. The closed loop control circuit determines at least one of a voltage across the load or a current through the load and provides the control signal to the DC to DC converter as a function of the determined voltage or current. The closed loop control circuit has a low pass crossover frequency greater than the frequency of the ripple voltage of the power factor correction circuit.

In another aspect of the invention, a light fixture receives alternating current (AC) power from an AC power source and provides light. The light fixture includes a light source, a driver circuit, and a housing. The light source provides light in response to receiving power. The housing supports the light source and the driver circuit. The driver circuit receives power from the AC power source and provides DC power to the light source. The driver circuit includes a power factor correction circuit, a DC to DC converter, and a closed loop control circuit. The power factor correction circuit receives AC power from the AC power source and provides a DC power rail. The DC power rail has a ripple voltage having a frequency. The DC to DC converter receives power from the DC power rail and provides a DC output voltage or current to the light source from a DC output of the DC to DC converter as a function of a control signal. The closed loop control circuit determines at least one of a voltage across the light source or a current through the light source and provides the control signal to the DC to DC converter as a function of the determined voltage or current. The closed loop control circuit has a low pass crossover frequency greater than the frequency of the ripple voltage of the power factor correction circuit.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
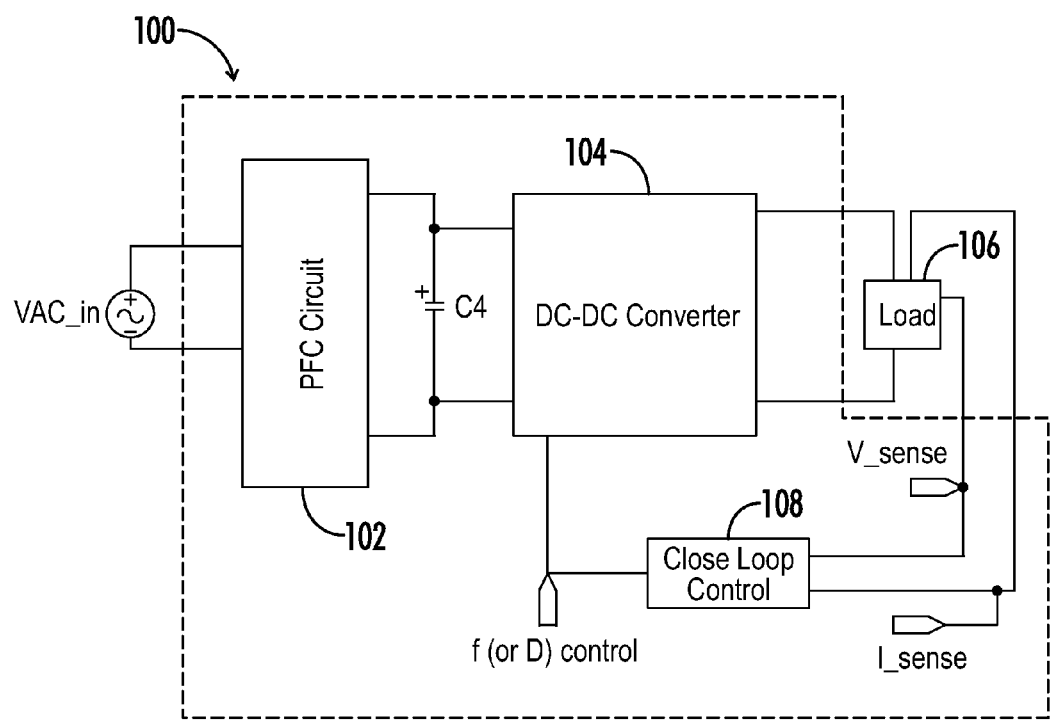
FIG. 1 is a block diagram and partial schematic diagram of a prior art current controlled driver circuit utilizing a bulk electrolytic capacitor between a PFC circuit and a DC to DC converter of the driver circuit.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The term "when" is used to specify orientation for relative positions of components, not as a temporal limitation of the claims or apparatus described and claimed herein unless otherwise specified.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

As discussed above referring to FIG. 1, for a 60 W PFC circuit 102 input and 460V PFC circuit 102 output, a 16 µF electrolytic capacitor C4 is used to limit the PFC circuit 102 output ripple to 1% at 120 Hz. If the ripple at the PFC circuit 102 output is allowed to increase to 20%, a 1 µF film capacitor could be used, resulting in a power supply (i.e., driver circuit)

that is smaller, has a significantly longer service life, and is less expensive to produce. However, the conventional closed loop control circuit 108 discussed above with respect to FIG. 1 has a crossover frequency less than 120 Hz such that the DC to DC converter 104 output would have an unacceptably high 20% 120 Hz ripple if the 1 μF film capacitor were substituted for the bulk electrolytic capacitor C4 (i.e., the DC to DC converter would not react to the large ripple and would instead pass it through to the output or load 106).

Figure 2:
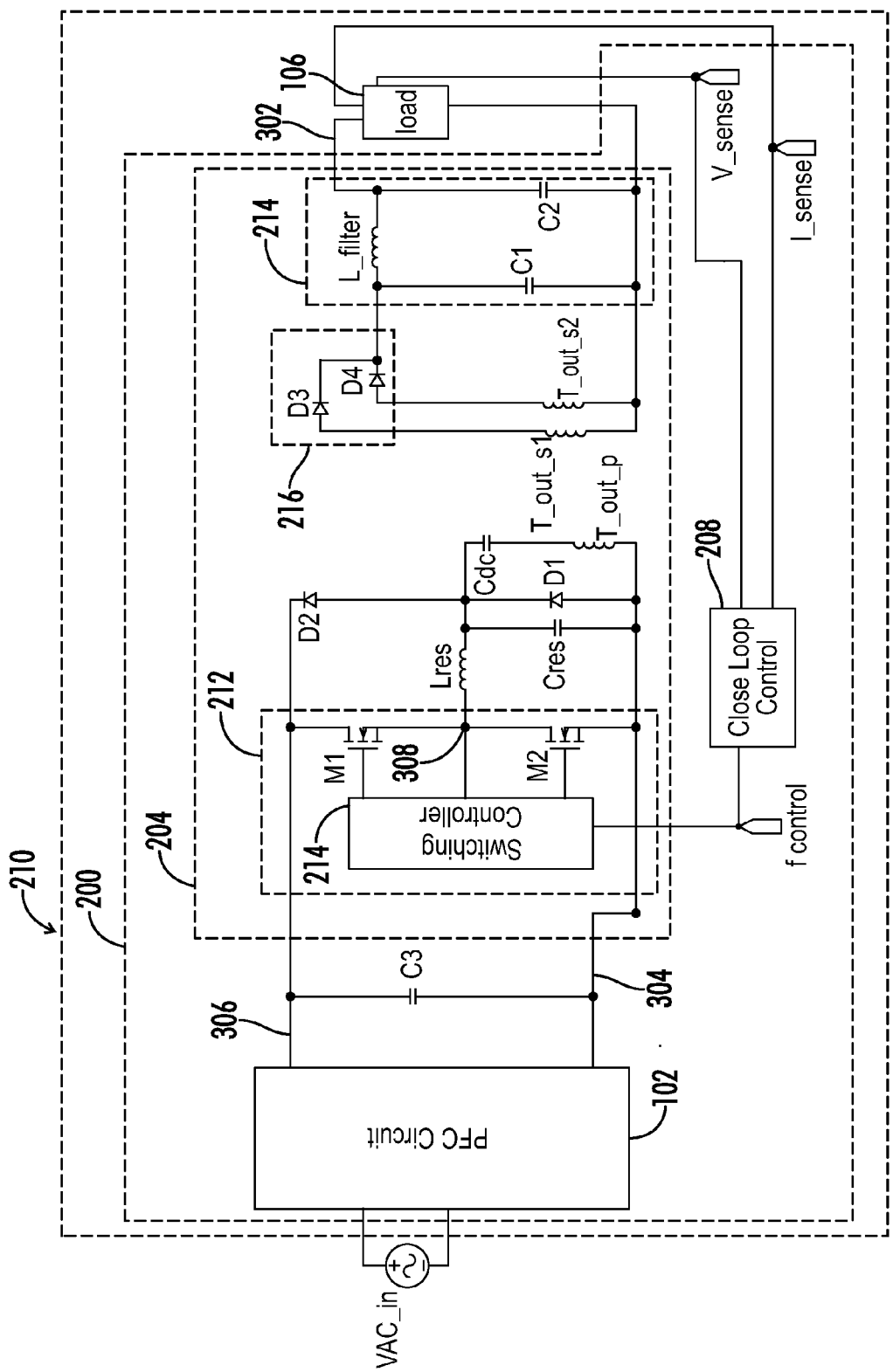
FIG. 2 is a block diagram and partial schematic diagram of a driver circuit for a light fixture utilizing a film capacitor between a PFC circuit and a DC to DC converter of the driver circuit.

Referring to FIG. 2, in one embodiment, a light fixture includes a housing 210, a driver circuit 200, and a load 106 (e.g., a light source). The driver circuit 200 includes a PFC circuit 102, an output capacitor C3, and a DC to DC converter 204. The output ripple of DC to DC converter 204 is reduced without using a bulk electrolytic capacitor across the output of the PFC circuit 102 by increasing the closed loop control circuit 208 crossover frequency to be greater than 120 Hz. Thus, the closed loop control circuit 208 will alter operation of the DC to DC converter 204 to respond to the 120 Hz ripple at the input of the DC to DC converter 204 instead of passing the ripple through to the output of the DC to DC converter 204 (i.e., to the load 106).

The DC to DC converter 204 has a variable gain such that it can provide a stable output current, voltage, or power level with either the minimum input voltage or maximum output voltage from the PFC circuit 102 to the DC to DC converter 204 (e.g., the PFC circuit 102 target output voltage plus or minus the ripper voltage). The DC to DC converter 204 also has a clamping mechanism that avoids output voltage overshoot when the input voltage to the DC to DC converter 204 is at a maximum and the closed loop control circuit 208 has a delay in adjusting operation of an inverter 212 of the DC to DC converter 204. The housing 210 supports the driver circuit 200 and the load 106.

In the driver circuit 200 of FIG. 2, the output capacitor C3 at the output of the PFC circuit 102 is a film capacitor instead of a bulk electrolytic capacitor. The film capacitor is smaller, has a longer service life, and is less expensive, but has a smaller capacitance. As a result, the voltage ripple across the output of the PFC circuit 102, output capacitor C3, and input to the DC to DC converter 204 is larger than the ripple would be with a higher capacitance bulk electrolytic capacitor used as the output capacitor C3. Referring back to Equation 1, the maximum output voltage $V_{pfc\_max}$ of the PFC circuit 102 is the average voltage output of the PFC circuit 102 plus the ripple voltage (see Equation 2). The minimum output voltage $V_{pfc\_min}$ of the PFC circuit 102 is the average voltage output of the PFC circuit 102 minus the ripple voltage (see Equation 3).

$$V_{pfc\_max} = V_{pfc\_avg} + \Delta V \quad \text{EQUATION 2:}$$

$$V_{pfc\_min} = V_{pfc\_avg} - \Delta V \quad \text{EQUATION 3:}$$

In one embodiment, the inverter 212 includes a high switch M1, a low switch M2, and a switching controller 214. The switching controller 214 (e.g., a voltage controlled oscillator or PWM switch) drives the high switch M1 and the low switch M2. The closed loop control circuit 208 sets the operating frequency for switching controller 214 as a function of a sensed (i.e., determined) current through the load 106 or voltage across the load 106. The high switch M1 and the low switch M2 form a half-bridge inverter topology. A resonant inductor Lres and a resonant capacitor Cres are configured as the primary resonant components in a resonant tank for the half bridge formed by the high switch M1 and the low switch M2. The resonant inductor Lres has a first side and a second side. The first side of the resonant inductor Lres is connected to the output 308 of the inverter 212. The resonant capacitor Cres is connected between the second side of the resonant inductor Lres and the circuit ground 304 formed by the PFC circuit 102 and the inverter 212.

A first diode D1 and a second diode D2 are configured to clamp the voltage across the resonant capacitor Cres. The first diode D1 and the second diode D2 limit the maximum voltage across the resonant capacitor Cres to the PFC circuit output voltage V_pfc_out. The first diode D1 has an anode connected to a circuit ground 304 formed by the PFC circuit 102 and the inverter 212 and a cathode connected to the second side of the resonant inductor. The second diode D2 has an anode connected to the second side of the resonant inductor L resin a cathode connected to the DC power rail 306 output by the PFC circuit 102. A DC blocking capacitor Cdc is configured to prevent DC current from going through an output transformer primary winding T_out_p. The output transformer has a first secondary winding T_out_s1 and a second secondary winding T_out_s2.

A rectifier 216 includes a third diode D3 and a fourth diode D4 configured to rectify the AC voltage from the first and second secondary windings T_out_s1 and T_out_s2 into a DC output voltage. An output filter 214 including a first capacitor C1, a second capacitor C2, and an inline inductor L_filter removes high frequency AC ripple from the DC output voltage from the rectifier 216 and provides the filtered DC output voltage to the load 106 at a DC output of the DC to DC converter 302.

Because the maximum voltage across the resonant capacitor Cres is clamped at the PFC circuit output voltage $V_{pfc\_out}$, the voltage across the output transformer primary winding T_out_p is clamped at $V_{pfc\_out}/2$. The output transformer secondary winding voltage is clamped at $N^*V_{pfc\_out}/2$ where N is the turns ratio of the output transformer between V_out_p/V_out_s and each secondary winding has the same number of turns.

Equation 4 shows the maximum output voltage $V_{out\_max}$ of the DC to DC converter 204.

$$V_{out\_max} = \frac{V_{pfc\_avg} + \Delta V}{2} \cdot \frac{1}{N} \quad \text{EQUATION 4}$$

Equation 4 shows that the turns ratio N can be selected such that the output voltage at the load 106 will not excessively overshoot (i.e., more than a predetermined percentage such as 5%) when the PFC output voltage $V_{pfc\_out}$ reaches the high peak (i.e., $V_{pfc\_avg}+\Delta V$) even though the closed loop control circuit 208 cannot respond fast enough to prevent the overshoot.

The input output transfer function of the DC to DC converter 204 is shown in Equation 5.

$$V_{out} = V_{pfc\_out} \cdot G(f,N) \quad \text{EQUATION 5}$$

Equation 5 shows that the output voltage $V_{out}$ from the DC to DC converter 204 is a function of frequency f and turns ratio N if the input voltage to the DC to DC converter 204 is fixed (i.e., if the output voltage of the PFC circuit $V_{pfc\_out}$ is fixed). Because the input voltage $V_{pfc\_min}$ can be 20% or even lower than the average output $V_{pfc\_avg}$ with a film capacitor C3 instead of a bulk electrolytic capacitor C4, the gain G of the tank has to be designed to handle the minimum input bulk voltage $V_{pfc\_min}$. If a minimum operating frequency for the inverter 212 is defined as $F_{min}$, N can be found by solving Equation 6 for N.

$$V_{out} = V_{pfc\_min} \cdot G(f_{min},N) \quad \text{EQUATION 6}$$

A turns ratio N that satisfies Equation 6 will provide that the resonant tank circuit (i.e., the resonant inductor Lres and resonant capacitor Cres) will have enough energy transfer capacity to achieve a predetermined output from the DC to DC converter 204 even when the input to the DC to DC converter $V_{pfc\_out}$ is at the minimum peak $V_{pfc\_min}$. To eliminate the ripple from the output of PFC $V_{pfc\_out}$ that would otherwise pass through the DC to DC converter 204, the crossover frequency of the closed loop control circuit 208 must be designed higher than twice the power source frequency VAC_in (e.g., 120 Hz for a 60 Hz power source). In one embodiment, the crossover frequency of the closed loop control circuit 208 is selected to be five times higher than the output frequency of the PFC circuit 102 (e.g., five times higher than the 120 Hz output from the PFC circuit 102 for a 60 Hz power source VAC_in), such that all variation less than the crossover frequency will be considered (and thus accounted for) by the closed loop control circuit 208. The oversized turns ratio N and resonant tank gain ensures that the ripple from the PFC circuit 102 will be compensated by the closed loop control circuit 208 adjusting the operating frequency of the half-bridge inverter 212 of the DC to DC converter 204.

Figure 3:
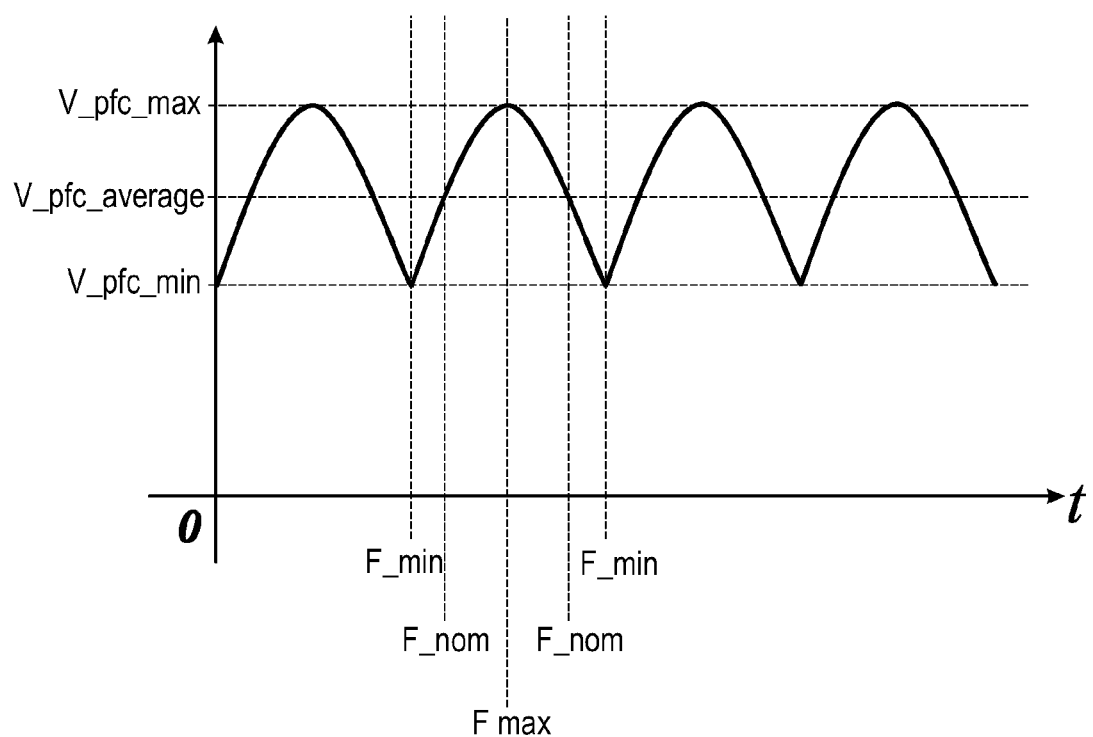
FIG. 3 is a diagram of PFC circuit output voltage versus inverter frequency for the driver circuit of FIG. 2.

Referring to FIG. 3, the closed loop control circuit 208 responds to voltage ripple at the PFC output by adjusting the operating frequency of the switching controller 214 of the inverter 212 to compensate for ripple at the input of the DC to DC converter 204 such that the ripple does not appear at the output of the DC to DC converter 204. At the minimum PFC output voltage $V_{pfc\_min}$, the operating frequency of the switching controller 214 is F_min. At the nominal PFC output voltage (i.e., the target output voltage of the PFC circuit 102), the operating frequency of the switching control 214 is F_nom. At the maximum PFC output voltage $V_{pfc\_max}$, the switching controller 214 operating frequency is F_max. By continuously adjusting the operating frequency to respond to input voltage ripple (i.e., ripple in the PFC circuit 102 output voltage $V_{pfc\_out}$), the output to the load 106 is stable and ripple free without the use of a bulk electrolytic capacitor C4 at the output of the PFC circuit 102.

In one embodiment, the driver circuit 200 has no bulk electrolytic capacitors. In another embodiment, a driver circuit 200 including a DC to DC converter 204 has a closed loop control circuit 208 low pass crossover frequency greater than twice the frequency of a power source VAC_in powering the driver circuit 200 such that the DC to DC converter 204 adjusts an operating frequency thereof to compensate for input voltage ripple from a PFC circuit 102 of the DC to DC converter 204. In another embodiment, the DC to DC converter 204 has a variable gain that can maintain output voltage and current even when DC voltage output from the PFC circuit 102 is at a minimum peak voltage (i.e., the target, nominal, or average output voltage of the PFC circuit 102 minus the ripple passed through the PFC circuit 102 from the power source VAC_in) or a maximum peak voltage (i.e., the target, nominal, or average output voltage of the PFC circuit 102 plus the ripple passed through the PFC circuit 102 from the power source VAC_in). In another embodiment, the DC to DC converter 204 has a clamped inverter output voltage to avoid output voltage overshoot when the input voltage (i.e., output voltage from the PFC circuit 102) is at a maximum peak and the control loop has a response delay.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful HIGH POWER FACTOR DC POWER SUPPLY WITH VARIABLE GAIN CONVERTER AND FAST-AVERAGING CONTROL LOOP it is not intended that such references be construed as limitations upon the scope of this invention except as set forth in the following claims.

What is claimed is:

1. A driver circuit configured to receive power from an alternating current (AC) power source and provide direct current (DC) power to a load, the driver circuit comprising:
    a power factor correction (PFC) circuit configured to receive AC power from the AC power source and provide a DC power rail, wherein the DC power rail has a maximum peak voltage and a minimum peak voltage corresponding to a ripple voltage having a frequency;
    a DC to DC converter configured to receive power from the DC power rail and provide a DC output voltage or current to the load from a DC output of the DC to DC converter as a function of a control signal; and
    a closed loop control circuit configured to
        determine at least one of a voltage across the load or a current through the load,
        set a nominal operating frequency for the DC to DC converter as a function of the determined voltage or current, and
        provide the control signal to the DC to DC converter as a function of the DC power rail, wherein a control signal associated with a minimum operating frequency corresponds to the minimum peak voltage for the DC power rail, and a control signal associated with a maximum operating frequency corresponds to the maximum peak voltage for the DC power rail,
    wherein the closed loop control circuit has a low pass crossover frequency greater than the frequency of the ripple voltage of the PFC circuit.

2. The driver circuit of claim 1, wherein the driver circuit is functional to operate without a bulk electrolytic capacitor connected across an output of the PFC circuit.

3. The driver circuit of claim 1, wherein the DC power rail provided by the PFC circuit has a ripple voltage greater than 5% and the DC output voltage or current at the DC output of the DC to DC converter has less than 5% ripple.

4. The driver circuit of claim 1, wherein:
    the DC to DC converter comprises an inverter and a resonant tank circuit; and
    the closed loop control circuit is configured to adjust the operating frequency of the DC to DC converter as a switching frequency of the inverter via the control signal.

5. The driver circuit of claim 1, wherein:
    the DC to DC converter comprises an inverter and a resonant tank circuit;
    the inverter has an output;
    the resonant tank circuit comprises
    a resonant inductor having a first side and a second side, wherein the first side is connected to the output of the inverter, and
    a resonant capacitor connected between the second side of the resonant inductor and a circuit ground of the inverter and PFC circuit; and
    the DC to DC converter further comprises
    a first diode having an anode connected to the circuit ground and a cathode connected to the second side of the resonant inductor, and
    a second diode having an anode connected to the second side of the resonant inductor and a cathode connected to the DC power rail.

6. The driver circuit of claim 1, wherein:
    the DC to DC converter comprises an inverter, a resonant tank circuit, and an output transformer;
    the inverter has an output;
    the resonant tank circuit comprises
    a resonant inductor having a first side and a second side, wherein the first side is connected to the output of the inverter, and
    a resonant capacitor connected between the second side of the resonant inductor and a circuit ground of the inverter and PFC circuit; and
    a turns ratio of the output transformer is selected to provide a predetermined DC output voltage or current to the load when a voltage of the DC power rail is at a minimum voltage equal to an average voltage of the DC power rail voltage minus the ripple voltage.

7. The driver circuit of claim 1, wherein:
    the AC power source is line power at 115 volts 60 Hz;
    the frequency of the ripple voltage is 120 Hz;
    the driver circuit further comprises a film capacitor connected between the DC power rail and a circuit ground provided by the PFC circuit; and
    the low pass crossover frequency of the closed loop control circuit is at least about five times the frequency of the ripple voltage.

8. The driver circuit of claim 1, wherein:
    the load is a light source; and
    the driver circuit comprises a constant current source.

9. The driver circuit of claim 1, wherein:
    the DC to DC converter comprises an inverter, a resonant tank circuit, and an output transformer;
    the inverter has an output;
    the resonant tank circuit comprises,
    a resonant inductor having a first side and a second side, wherein the first side is connected to the output of the inverter, and
    a resonant capacitor connected between the second side of the resonant inductor and a circuit ground of the inverter and PFC circuit;
    the DC to DC converter further comprises a first diode having an anode connected to the circuit ground and a cathode connected to the second side of the resonant inductor and a second diode having an anode connected to the second side of the resonant inductor and a cathode connected to the DC power rail; and a turns ratio of the output transformer is selected to provide a predetermined DC output voltage or current to the load when a voltage of the DC power rail is at a minimum voltage equal to an average voltage of the DC power rail voltage minus the ripple voltage.

10. A light fixture configured to receive alternating current (AC) power from an AC power source and provide light, said light fixture comprising:

a light source operable to provide light in response to receiving power;

a driver circuit operable to receive power from the AC power source and provide DC power to the light source, said driver circuit comprising a power factor correction (PFC) circuit configured to receive AC power from the AC power source and provide a DC power rail, wherein the DC power rail has a maximum peak voltage and a minimum peak voltage corresponding to a ripple voltage having a frequency, a DC to DC converter configured to receive power from the DC power rail and provide a DC output voltage or current to the light source from a DC output of the DC to DC converter as a function of a control signal, and a closed loop control circuit configured to
determine at least one of a voltage across the light source or a current through the light source, set a nominal operating frequency for the DC to DC converter as a function of the determined voltage or current, and provide the control signal to the DC to DC converter as a function of the DC power rail, wherein a control signal associated with a minimum operating frequency corresponds to the minimum peak voltage for the DC power rail, and a control signal associated with a maximum operating frequency corresponds to the maximum peak voltage for the DC power rail, wherein the closed loop control circuit has a low pass crossover frequency greater than the frequency of the ripple voltage of the PFC circuit; and a housing supporting the light source and the driver circuit.

11. The light fixture of claim 10, wherein the driver circuit is configured to eliminate a bulk electrolytic capacitor connected across an output of the PFC circuit.

12. The light fixture of claim 10, wherein the DC power rail provided by the PFC circuit has a ripple voltage greater than 5% and the DC output voltage or current at the DC output of the DC to DC converter has less than 5% ripple.

13. The light fixture of claim 10, wherein:
the DC to DC converter comprises an inverter and a resonant tank circuit; and
the closed loop control circuit is configured to adjust the operating frequency of the DC to DC converter as a switching frequency of the inverter via the control signal.

14. The light fixture of claim 10, wherein:
the DC to DC converter comprises an inverter and a resonant tank circuit;
the inverter has an output;
the resonant tank circuit comprises a resonant inductor having a first side and a second side, wherein the first side is connected to the output of the inverter, and a resonant capacitor connected between the second side of the resonant inductor and a circuit ground of the inverter and PFC circuit; and the DC to DC converter further comprises a first diode having an anode connected to the circuit ground and a cathode connected to the second side of the resonant inductor and a second diode having an anode connected to the second side of the resonant inductor and a cathode connected to the DC power rail.

15. The light fixture of claim 10, wherein:
the DC to DC converter comprises an inverter, a resonant tank circuit, and an output transformer;
the inverter has an output;
the resonant tank circuit comprises a resonant inductor having a first side and a second side, wherein the first side is connected to the output of the inverter, and a resonant capacitor connected between the second side of the resonant inductor and a circuit ground of the inverter and PFC circuit; and a turns ratio of the output transformer is selected to provide a predetermined DC output voltage or current to the light source when a voltage of the DC power rail is at a minimum voltage equal to an average voltage of the DC power rail voltage minus the ripple voltage.

16. The light fixture of claim 10, wherein:
the AC power source is line power at 115 volts 60 Hz;
the frequency of the ripple voltage is 120 Hz;
the driver circuit further comprises a 1 µF film capacitor connected between the DC power rail and a circuit ground provided by the PFC circuit; and
the low pass crossover frequency of the closed loop control circuit is at least about five times the frequency of the ripple voltage.

17. The light fixture of claim 10, wherein:
the driver circuit is a constant current source; and
the light source comprises a light emitting diode.

18. The light fixture of claim 10, wherein:
the DC to DC converter comprises an inverter, a resonant tank circuit, and an output transformer;
the inverter has an output;
the resonant tank circuit comprises a resonant inductor having a first side and a second side, wherein the first side is connected to the output of the inverter, and a resonant capacitor connected between the second side of the resonant inductor and a circuit ground of the inverter and PFC circuit;

the DC to DC converter further comprises a first diode having an anode connected to the circuit ground and a cathode connected to the second side of the resonant inductor and a second diode having an anode connected to the second side of the resonant inductor and a cathode connected to the DC power rail; and a turns ratio of the output transformer is selected to provide a predetermined DC output voltage or current to the light source when a voltage of the DC power rail is at a minimum voltage equal to an average voltage of the DC power rail voltage minus the ripple voltage.

* * * * *